(No Model.)

J. J. WHITE.
HOIST.

No. 317,904. Patented May 12, 1885.

Witnesses:
M. A. White.
E. C. White.

Inventor:
Joseph J. White

UNITED STATES PATENT OFFICE.

JOSEPH J. WHITE, OF NEW LISBON, NEW JERSEY, ASSIGNOR TO THE UNION HOIST COMPANY, (LIMITED,) OF PHILADELPHIA, PENNSYLVANIA.

HOIST.

SPECIFICATION forming part of Letters Patent No. 317,904, dated May 12, 1885.

Application filed August 26, 1884. (No model.)

*To all whom it may concern:*

Be it known that I, JOSEPH J. WHITE, a citizen of the United States, residing at New Lisbon, Burlington county, New Jersey, have invented a new and useful Improvement in Hoists, of which the following is a specification.

My invention relates to improvements in hoists having a differential movement caused by gyrating a gear in connection with one or more other gears having a different number of teeth; and the objects of my improvements are to provide means for raising heavy weights by the use of small gears, and also to prevent the hoist from running down when loaded, by means calculated to produce the least amount of friction. I attain these objects by the mechansm illustrated in the accompanying drawings, in which—

Figure 1:
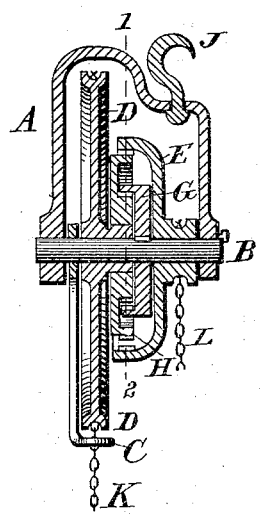
Figure 2:
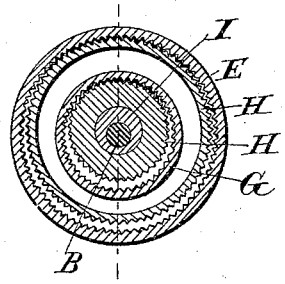

Figure 1 is a vertical section of the entire mechanism, and Fig. 2 is a vertical section through the line 1 2.

Similar letters refer to similar parts throughout the several views.

The yoke A A is supported by the hook J, and carries a stationary shaft, B. The sprocket-wheel D, with an eccentric, I, attached to its hub, revolves freely upon the shaft B, being driven by the hand-chain K. A double gear, H, is mounted upon the eccentric so that one set of its teeth mesh with a gear, G, which is firmly secured to the stationary shaft B, and the other set of teeth mesh with the gear E, which carries the lift-chain L. When power is applied to the wheel D, the eccentric I revolves in the gear H; but as the gear H is meshed in the stationary gear G it receives a gyrating or swaying movement and at the same time a rotary movement, due to the differential number of teeth between it and the gear G. The gear H also meshes with the gear E, imparting to the latter a rotary motion, due to the differential number of teeth between the gears H and E. By the use of the stationary gear keyed to the shaft I avoid the friction incident to other devices intended to make such a hoist self-sustaining as regards its load. When arranged as shown, the gears H and E rotate in different directions, thus enabling me to make the forward or lifting movement of the gear E very slow for heavy weights.

The cause of the gears H and E rotating in different directions will be readily understood from the following explanation—viz: Supposing the fixed gear G to have twenty teeth and the gyrating gear H, which meshes with it, to have nineteen teeth, it is evident that at each gyration the gear H would lose one tooth, or move to the left, for instance, a distance equal to the pitch of one tooth, while if the lifting-gear E has twenty teeth and the gyrating gear H, which meshes with it, has but nineteen teeth, it is evident that at each gyration of the gear H the gear E would gain one tooth, or move to the right a distance equal to the pitch of one tooth; but the pitch of the large gear E is greater than the pitch of the fixed gear G, and as the gear H moves one tooth to the left and the gear E one tooth to the right it is evident that the net gain of the lifting-gear E would be toward the right a distance equal to the difference in pitch between the gears G and E, which may be made very slight, if desired. It will also be observed that I locate the fixed gear between the lifting-gear E and the gyrating gear H, thus securing compactness and cheapness of construction, at same time effectually covering the fixed gear and protecting it from dust and dirt. By placing both sets of teeth of the double gear in the same plane or on one side of the plate I also secure compactness and cheapness of construction.

What I claim as my invention, and desire to secure by Letters Patent, is—

1. A fixed gear, G, firmly secured to a stationary shaft, B, between the lifting-gear E and the gyrating gear H, substantially as and for the purpose set forth.

2. In a hoisting-machine, a fixed gear, G, keyed to a stationary shaft passing through its center, in combination with a double gear, H, driven by an eccentric, as and for the purpose set forth.

3. The combination of a stationary gear, G, a double gear, H, having its teeth in the same plane, a lifting-gear, E, and an eccentric, I, substantially as and for the purpose set forth.

4. In a hoisting machine, a stationary gear, G, in combination with a gyrating gear, H, and a lifting-gear, E, arranged to revolve in opposite directions, substantially as and for the purpose set forth.

JOSEPH J. WHITE.

Witnesses:
ALFRED W. EYRE,
S. A. KOCH.